United States Patent [19]

Deb et al.

[11] 4,117,210

[45] Sep. 26, 1978

[54] PHOTOGALVANIC CELL HAVING TRANSPARENT PHOTOACTIVE TIO₂ THIN FILM

[75] Inventors: Satyendra K. Deb, East Brunswick; Schoen-nan Chen, North Brunswick; Horst Witzke, Princeton, all of N.J.; Michael A. Russak, Farmingdale; Joseph Reichman, Great Neck, both of N.Y.

[73] Assignees: Optel Corporation, Princeton, N.J.; Grumman Aerospace Corporation, Bethpage, N.Y.

[21] Appl. No.: 763,072

[22] Filed: Jan. 27, 1977

[51] Int. Cl.² .................. H01M 6/30; H01M 6/36
[52] U.S. Cl. .................................................. 429/111
[58] Field of Search ........................................ 429/111

[56] References Cited

U.S. PATENT DOCUMENTS

| 4,011,149 | 3/1977 | Nozik | 204/129 |
| 4,042,758 | 8/1977 | Weinstein et al. | 429/111 |

OTHER PUBLICATIONS

M. S. Wrighton et al., "Photoassisted Electrolysis of Water by Irradiation of a Titanium Dioxide Electrode," *Proc. Nat. Acad. Sci. U.S.A.*, vol. 72, pp. 1518-1522, (1975).

K. Hardee et al., "Semiconductor Electrodes, Part I," *J. Electrochem. Soc.*, vol. 122, pp. 739-742, (1975).

*Primary Examiner*—Aaron Weisstuch
*Attorney, Agent, or Firm*—Morris Liss; Israel Gopstein

[57] ABSTRACT

A photogalvanic cell includes a conducting SnO₂ electrode upon which is deposited a semi-transparent film of Ti. A metal oxide thin film, such as TiO₂ is in turn deposited upon the semi-transparent Ti thin film. An aqueous (acid or base) electrolyte contacts the metal oxide thin film to form a photoactive site for converting light to electrical energy. The semi-transparent film reduces the internal resistance of the cell by assisting charge transfer between the metal oxide film and the electrode. Also, use of a semi-transparent film permits bi-directional irradiation of the cell to increase photoconversion efficiency.

13 Claims, 3 Drawing Figures

PHOTOGALVANIC CELL HAVING TRANSPARENT PHOTOACTIVE $TiO_2$ THIN FILM

FIELD OF THE INVENTION

The present invention relates to photogalvanic cells, and more particularly to such a cell utilizing an aqueous electrolyte for forming a photoactive site with a conductive solid material.

BRIEF DESCRIPTION OF THE PRIOR ART

In a copending application entitled "Thin Film Photogalvanic Cell" by Horst Witzke et al, Ser. No. 763,073 filed concurrently herewith assigned to the assignee of the present application, the utilization of a $TiO_2$ thin film as a photoactive device, instead of $TiO_2$ powder pigment mixed in an aqueous electrolyte, is disclosed. Although one of the primary advantages of the $TiO_2$ thin film is the reduction of internal cell resistance, it has been found that even with $TiO_2$ thin film there is still an appreciable internal resistance. Accordingly, it is desirable to further reduce the internal resistance of the cell which is thought to be due to the poor electron transfer across the $SnO_2$ electrode-$TiO_2$ thin film interface.

The usefulness of depositing a $TiO_2$ thin film on a material such as Ti has been recognized in an article entitled SEMICONDUCTOR ELECTRODES by Hardee and Bard, appearing in the JOURNAL OF THE ELECTROCHEMICAL SOCIETY, June, 1975. In this publication, a $TiO_2$ thin film is deposited upon a relatively thick Ti substrate.

BRIEF DESCRIPTION OF THE PRESENT INVENTION

The present invention is an improvement of the invention as disclosed in the mentioned copending application as well as the structure set forth in the above-mentioned article. By recognizing that a Ti film can be deposited as a semi-transparent thin film, such a thin film may be interposed between $TiO_2$ and an electrode such as $SnO_2$, to not only improve the mentioned electron transfer but also to enable the structure of the present invention to be irradiated bi-directionally so that photoconversion efficiency may be increased to a degree not possible by the mentioned prior art, taken singly or in combination.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
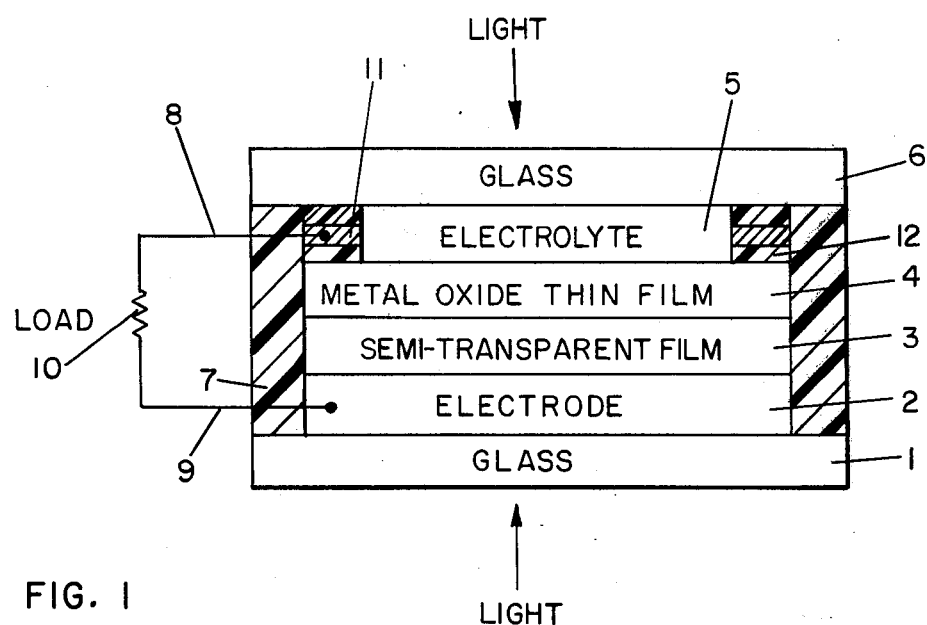
FIG. 1 is a diagrammatic cross-sectional view of a first embodiment of the present invention.

Referring to the figures and more particularly FIG. 1, a first embodiment is seen to include a light transparent glass substrate 1 having a thin film conductive material serving as electrode 2 deposited thereon. Typically, the electrode may be fabricated from materials such as conducting $SnO_2$. The electrode-glass substrate combination is available in prefabricated form and is known in the industry as Nesa glass. A semi-transparent metal film 3 is appropriately deposited on the electrode 2 by means such as thermal evaporation, sputtering or chemical vapor deposition. In the preferred embodiment of the invention, the semi-transparent film is Ti. Titanium is disclosed by way of illustration and not of limitation. Other metals may, of course, be used as disclosed infra. The significance of the illustration is that means which are at least semi-transparent and positioned in an abutting relationship between the electrode 2 and a metal oxide thin film 4 are provided, for facilitating charge transfer between the metal oxide and the electrode. This material serves as an intermediate layer between a subsequently deposited metal oxide thin film 4 of material such as $TiO_2$ and the electrode 2. This intermediary layer facilitates electron transfer between the thin film 4 and the electrode 2. It is again noted that the Ti film is semi-transparent which permits bi-directional irradiation of the cell as will be discussed hereinafter. Thus, both Ti and $TiO_2$ are used by way of illustration and not of limitation in the present disclosure.

As illustrated in the figure, above the metal oxide thin film 4 is an aqueous electrolyte which may, for example, be a solution of $H_2SO_4$ and water. The upper end of the cell is sealed with a transparent glass disc 6. However, a transparent plastic disc would suffice.

In order to permit the withdrawal of electrical charge from the cell, a counterelectrode is necessary. Since most known efficient counterelectrodes, for a photogalvanic cell of the present type, are opaque, it is necessary to mount the counterelectrode in such a way that the interface between the glass disc 6 and the electrolyte 5 may be irradiated with light through disc 6. Also, it is necessary for the counterelectrode to form an interface with the electrolyte 5 so that charge transfer may occur from the electrolyte to the counterelectrode 11.

The figure illustrates one means of positioning the counterelectrode so that both of the aforementioned conditions are met. However, a number of alternate physical arrangements for the counterelectrode 11 will be obvious to one skilled in the art. As shown, the counterelectrode 11 is an annular ring, fabricated from a material such as carbon or platinized carbon. The counterelectrode 11 has an interface with the electrolyte and does not substantially block the passage of irradiating light through the glass disc 6 and through the electrolyte 5. The counterelectrode 11 is insulated from the metal oxide thin film 4 and is properly supported by a grooved annular insulating ring 12 which may be formed from a suitable inert insulating material, such as epoxy.

An outer wall 7 seals and supports the outward edges of the inner cell components. The wall 7 may be fabricated from an appropriate inert insulating material such as epoxy.

Wires 8 and 9 are respectively connected to the counterelectrode 11 and electrode 2 thereby enabling a load 10 to be connected between the wires and to draw electrical power from the cell during irradiation by a light source.

Typically, a thickness for the Ti semi-transparent film 3 and the $TiO_2$ metal oxide thin film 4 are approximately 500 Angstroms and approximately 2,000 Angstroms, respectively.

In operation of the illustrated device, when it is irradiated with ultraviolet light corresponding to the absorbing frequency of $TiO_2$ either by exposing the $TiO_2$ thin film 4 through the Ti semi-transparent film 3 or through the electrolyte 5, an emf is generated across electrodes 2 and 11.

Figure 2:
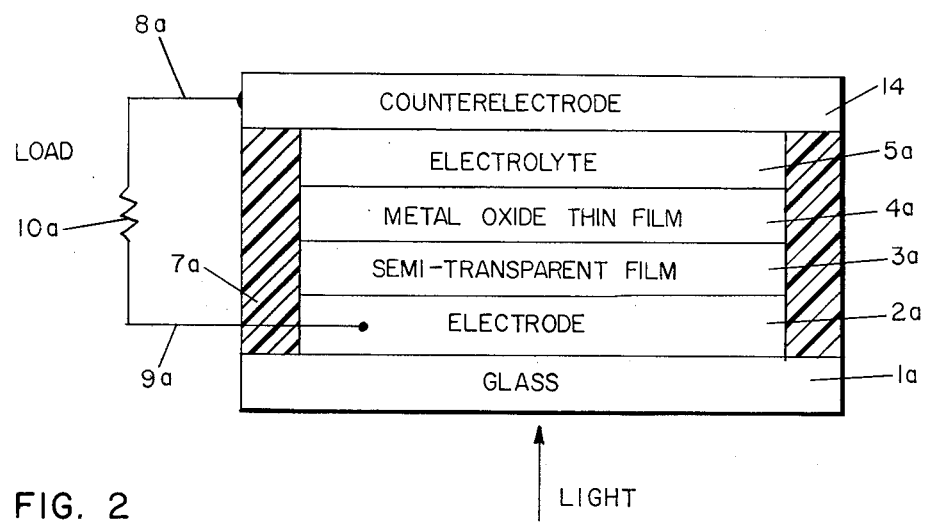
FIG. 2 is a diagrammatic cross-sectional view of a second embodiment of the present invention.

Referring to FIG. 2, a modified form of the invention is shown as a second embodiment. Components of the cell which are identical to the first mentioned embodiment of FIG. 1 are numbered similarly with the suffix "a" added to the numerals in FIG. 2. As will be noticed, the transparent glass disc 6 of FIG. 1 is replaced with a counterelectrode 14, which may be made of carbon. This particular embodiment is therefore simplified in structure as compared with the embodiment of FIG. 1 since the counterelectrode 11 in the previous embodiment need not be machined in ring form and specially insulated from the thin film 5. As a result of the simplified structure, a cost saving may be realized when compared to the first embodiment but the disadvantage is the loss of bi-directional irradiation of the cell. However, the inclusion of the light transparent glass substrate 1a still permits the irradiation of films 3a and 4a to achieve effective energy conversion. Of course, the inclusion of the semi-transparent film 3a is included to reduce the internal resistance of the cell by assisting charge transfer between the metal oxide thin film 4a and the electrode 2a. The embodiment of FIG. 2 is a preferred embodiment in that the simplified structure achieves increased photoconversion efficiency at a lower manufacturing cost.

Figure 3:
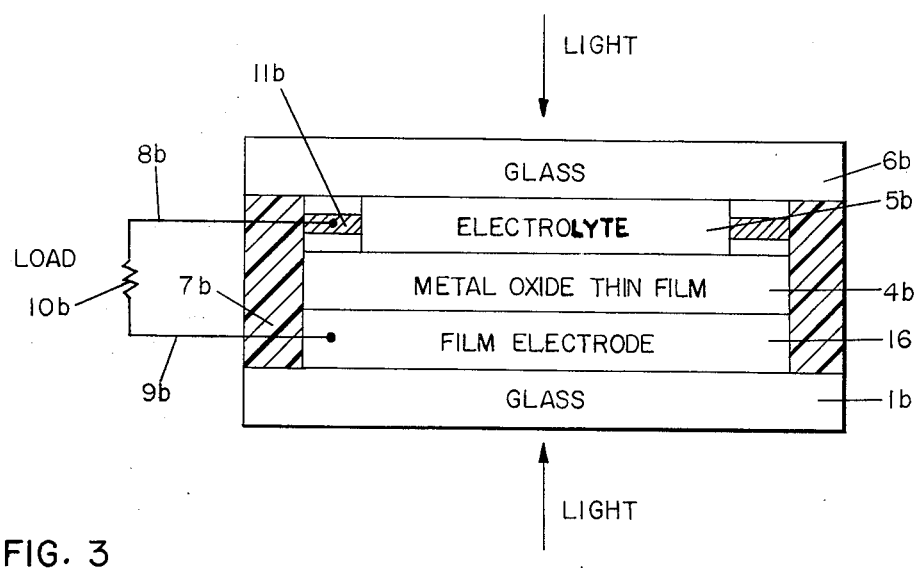
FIG. 3 is a diagrammatic cross-sectional view of a third embodiment of the present invention.

FIG. 3 illustrates a third embodiment of the invention which eliminates the utilization of a separate electrode. As in the case of the embodiments shown in FIGS. 1 and 2, the third embodiment of FIG. 3 utilizes similarly numbered components which are identical to those of the previous embodiments, but with the suffix "b" added. As will be noted from FIG. 3, a light transparent glass substrate 1b and a transparent glass disc 6b permit bi-directional irradiation of the cell. Once again, a counterelectrode 11b, which may take the form of an annular ring contacting the electrolyte 5b, is included. The major distinction of the third embodiment is the elimination of a separate electrode as previously indicated in FIGS. 1 and 2 as 2 and 2a, respectively. Instead, a single thin film of Ti at 16 is present between the metal oxide thin film 4b and the glass substrate 1b. By utilizing Ti as a single layer at 16, the lead 9b may be directly attached to the Ti layer and the Ti material still reduces the internal resistance of the cell by assisting charge transfer between the metal oxide film 4b and the lead 9b. In the event that further simplification is desired, the transparent glass disc 6b and the counterelectrode 11b may be replaced by a single counterelectrode such as 14 as shown in FIG. 2.

A number of alternate embodiments of this invention are possible. For example, the Ti metal can be replaced by other thin film metal electrodes such as Au, Pt, etc. Further, the TiO$_2$ may conceiveably be utilized in the anatase form as well as the more usual rutile form.

As will be seen from the above discussion of the invention, certain embodiments of the present device have the capability of being irradiated bi-directionally, either simultaneously or separately to improve the efficiency of the device. It should also be noted that the use of the Ti thin film under the TiO$_2$ thin film layer 4, instead of the mentioned prior art Ti metal sheet substrates offers significant cost reductions.

It should be understood that the invention is not limited to the exact details of construction shown and described herein for obvious modifications will occur to persons skilled in the art.

We claim the following:

1. A photogalvanic cell that may be irradiated in more than one direction, the cell comprising:
   a light transparent electrode for collecting electrical charge of a particular polarity generated by photoconversion of irradiating light;
   metal oxide means positioned in spaced registry from the electrode;
   means which are at least semi-transparent and positioned in abutting relation between the electrode and the metal oxide means for facilitating charge transfer between the metal oxide means and the electrode;
   a light passing electrolyte contacting a free surface of the metal oxide means, a photoactive junction being formed therebetween for converting light to electrical energy; and
   a counterelectrode in contact with the electrolyte and positioned so that it does not block irradiating light from passing to the electrolyte, the counterelectrode collecting electrical charge of an opposite polarity generated by photoconversion of the irradiating light.

2. The subject matter set forth in claim 1 together with a light transparent member for sealing the electrolyte in the cell.

3. The subject matter set forth in claim 2 and further wherein:
   the electrode is fabricated from SnO$_2$ thin film;
   the metal oxide means is TiO$_2$ thin film;
   the transparent means is Ti thin film; and
   the counterelectrode is fabricated from carbon.

4. The subject matter set forth in claim 3 together with:
   means connected to the electrode and counterelectrode for transferring electrical charge to an external load; and
   means positioned between the electrode and counterelectrode for supporting members of the cell and also insulating the electrode and counterelectrode from each other.

5. The subject matter set forth in claim 1 wherein the electrode is fabricated from SnO$_2$ thin film.

6. The subject matter set forth in claim 1 wherein the metal oxide means is TiO$_2$ thin film.

7. The subject matter set forth in claim 1 wherein the semi-transparent means is Ti thin film.

8. The subject matter set forth in claim 1 wherein the counterelectrode is fabricated from carbon.

9. The subject matter set forth in claim 1 together with means connected to the electrode and counterelectrode for transferring electrical charge to an external load.

10. The subject matter set forth in claim 1 together with means positioned between the electrode and counterelectrode for supporting members of the cell and also insulating the electrode and counterelectrode from each other.

11. A photogalvanic cell comprising:
   a light transparent substrate;
   metal oxide means positioned in spaced registry from the substrate;
   light passing conductive means comprising a light passing layer fabricated from Ti positioned between the substrate and a first surface of the metal oxide means;

a light passing electrolyte contacting an opposite surface of the metal oxide means, a photoactive junction being formed therebetween for converting light to electrical energy;

a lead connected to the conductive means for conducting generated current from the cell;

and a counterelectrode contacting said electrolyte;

the presence of the conductive means between the metal oxide means and the lead reducing the internal resistance of the cell by improving charge transport between the metal oxide means and the lead.

12. The subject matter set forth in claim 11 wherein the light passing conductive means comprises:

a light passing electrode, having first and second sides, contacting the substrate along said first side thereof for collecting electrical charge of a particular polarity generated by photoconversion of irradiating light, and connected to said lead;

said light passing layer comprising Ti, having first and second surfaces, contacting said second side of the electrode along said first surface thereof, said second surface of the light passing layer contacting the metal oxide means, the light passing layer facilitating charge transfer between the metal oxide means and the electrode.

13. The subject matter set forth in claim 12 wherein the metal oxide means is fabricated from $TiO_2$.